No. 654,111. Patented July 17, 1900.
G. W. GOMBER.
SEALING DEVICE.
(Application filed July 14, 1898.)
(No Model.)

Witnesses
E. E. Overholt
A. G. Miller

Geo. W. Gomber
Inventor
By
W. T. Fitzgerald
Attorney

THE NORRIS PETERS CO., PHOTO-LITHO., WASHINGTON, D. C.

UNITED STATES PATENT OFFICE.

GEORGE W. GOMBER, OF CONYNGHAM, PENNSYLVANIA, ASSIGNOR TO HARRY GOMBER, OF SAME PLACE.

SEALING DEVICE.

SPECIFICATION forming part of Letters Patent No. 654,111, dated July 17, 1900.

Application filed July 14, 1898. Serial No. 685,948. (No model.)

*To all whom it may concern:*

Be it known that I, GEORGE W. GOMBER, a citizen of the United States, residing at Conyngham, in the county of Luzerne and State of Pennsylvania, have invented certain new and useful Improvements in Sealing Devices; and I do hereby declare the following to be a full, clear, and exact description of the invention, such as will enable others skilled in the art to which it appertains to make and use the same.

My invention relates to sealing devices for fruit-jars or the like; and it consists of certain details of construction, the preferred materialization of which will be hereinafter pointed out.

The object of my invention is to provide a reliable seal for fruit-jars and means for seating and retaining in place the usual rubber gasket employed to perfect the union between the jar and the cap.

Figure 1:
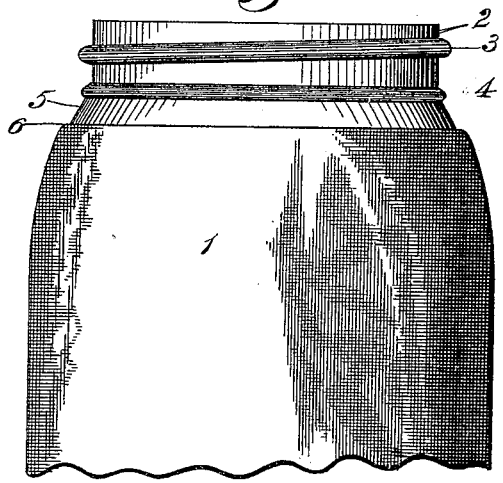
Figure 2:
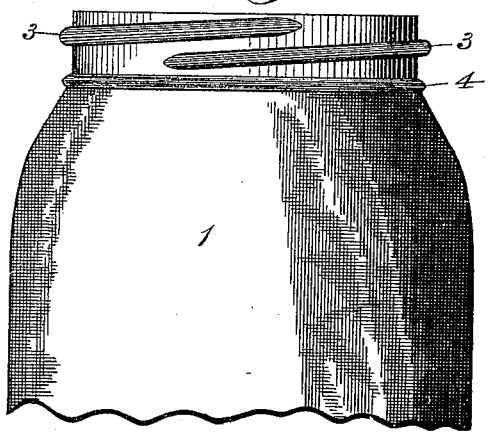

In the accompanying drawings, Figure 1 is a side view of my invention complete. Fig. 2 shows another form of construction wherein the lower side or shoulder of the recess designed to receive the rubber gasket is removed, while Fig. 3 is a central section of Fig. 1, showing the retaining-cap and rubber gasket in place.

The essential feature of my invention consists in providing an inclined retaining seat or recess in which the rubber gasket usually employed is reliably locked against upward and downward movement, the upward movement being prevented by a shoulder or rib.

Referring to the drawings, 1 represents the upper portion of a jar of the usual or any preferred construction provided with the usual mouth or upper rim 2, having the thread 3 for engaging with the cap or lid, while at the base of the mouth or rim 2, preferably at its point of union with the jar proper, I locate the annular or continuous rib or shoulder 4. Immediately below the rib 4 I locate the inclined recess or seat 5, within which is received the rubber gasket usually employed to perfect the union between the lid and jar, the lower part of the recess being formed by the offset or shoulder 6, as shown in Figs. 1 and 3. In Fig. 2 it will be seen, however, that the shoulder 6 may be entirely omitted, if preferred, as said shouler is not thought to be necessary, owing to the fact that the tendency of the rubber gasket is mainly upward against the rib 4. I prefer, however, to secure both forms of construction in this application, though the essential feature of my invention consists in providing the annular or continuous rib 4, preferably located at the base of the threaded section forming the neck of the jar, as clearly shown. By means of this construction an inclined seat is always ready for the reception of the gasket, and as there are but few extensions of the surface little obstruction is presented for the accumulation of dirt, the jar thereby remaining in a cleanly condition.

Figure 3:
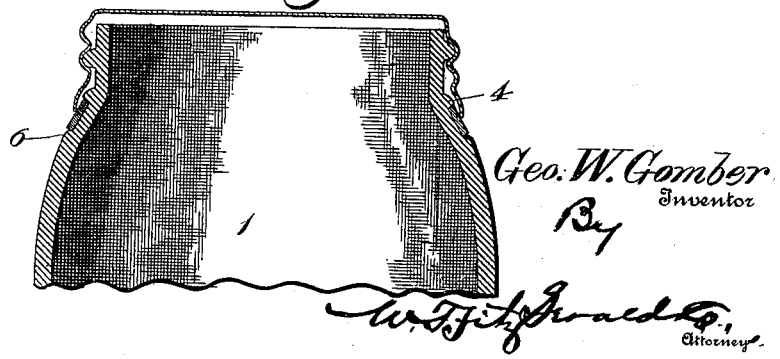

The use of my jar may be stated to be substantially the same as that of the ordinary jar in common use—that is to say, the rubber gasket is seated in the recess 5 below the shoulder 4, when the cap or lid may be screwed home, as shown in Fig. 3, the depending edge of the cap being received by the rubber gasket, thus setting up a wedge-like condition between said points and insuring that a perfect seal will be effected.

Having thus fully described my invention, what I claim as new, and desire to secure by Letters Patent, is—

1. A jar provided with a threaded neck designed to receive the lid and having an annularly-inclined recess for receiving the gasket, and a continuous rib located at the upper edge of said recess and below the threads upon the neck, said rib being continuous entirely around the neck of the jar and designed to prevent the upward movement of the gasket, as described and for the purpose set forth.

2. A jar or the like, provided with a threaded neck, an annular rib adjacent to said neck and extending continuously around the neck of the jar and an inclined seat located below said rib whereby the rubber gasket fitting thereon will be prevented by said rib from having an upward movement, as described and for the purpose set forth.

3. As an improvement in jars or the like, a sealing device consisting of an inclined seat designed to receive a yielding gasket, a continuous horizontally-disposed rib extending entirely around the neck of the jar at a point thereon adjoining the upper edge of said inclined seat, a threaded neck formed upon the jar adjacent to said seat and rib, in combination with a threaded cap designed to engage the threads upon the jar and having a depending flange designed to rest upon the gasket carried by said seat, as specified and for the purpose set forth.

4. As a new article of manufacture, a jar provided with a threaded neck, an inclined gasket-seat below the threaded neck, and with gasket-retaining means, separate from the threads of the neck and extending around the same, between the threaded neck and the seat, as and for the purpose set forth.

In testimony whereof I affix my signature in presence of two witnesses.

GEORGE W. GOMBER.

Witnesses:
HARRY GOMBER,
I. M. HUNTER.